United States Patent
Zong

(10) Patent No.: US 9,094,341 B2
(45) Date of Patent: Jul. 28, 2015

(54) METHOD AND DEVICE FOR UPDATING PORT INDEX, AND MULTI-DEVICE SYSTEM

(71) Applicant: Huawei Technologies Co., Ltd., Shenzhen (CN)

(72) Inventor: Zhigang Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 13/764,455

(22) Filed: Feb. 11, 2013

(65) Prior Publication Data

US 2014/0050117 A1   Feb. 20, 2014

(30) Foreign Application Priority Data

Apr. 19, 2012  (CN) .......................... 2012 1 0115443

(51) Int. Cl.
*H04L 12/741* (2013.01)
*G06F 13/38* (2006.01)
*H04L 12/24* (2006.01)

(52) U.S. Cl.
CPC .............. *H04L 45/54* (2013.01); *G06F 13/385* (2013.01); *H04L 41/0853* (2013.01)

(58) Field of Classification Search
None
See application file for complete search history.

(56) References Cited

U.S. PATENT DOCUMENTS

2009/0082047 A1* 3/2009 Phillips et al. ................ 455/517
2010/0182933 A1* 7/2010 Hu et al. ....................... 370/254

OTHER PUBLICATIONS

Extended European Search Report issued in corresponding European Patent Application No. 13155755.5, mailed Jun. 5, 2013, 7 pages.

* cited by examiner

*Primary Examiner* — Habte Mered
(74) *Attorney, Agent, or Firm* — Brinks Gilson & Lione

(57) ABSTRACT

Embodiments of the present invention relate to a method and a device for updating a port index in a multi-device system, and a multi-device system. The method includes: detecting whether a device ID of a device is changed in a multi-device system, where the detecting is performed by comparing device IDs of each device in the multi-device system before and after the detection; and for a device whose device ID is changed in the system, updating a port index of the device according to the device ID after the change, where the port index is used to acquire configuration data of the port. The embodiments of the present invention solve the problem of failing to find correct port configuration data by using the port index because the device ID is changed.

17 Claims, 6 Drawing Sheets

First index: (device ID, bridge MAC address of the device)

Second index: (bridge MAC address of the device, port number)

METHOD AND DEVICE FOR UPDATING PORT INDEX, AND MULTI-DEVICE SYSTEM

CROSS-REFERENCE TO THE RELATED APPLICATION

This application claims priority to Chinese Patent Application No. 201210115443.6, filed on Apr. 19, 2012, which is hereby incorporated by reference in its entirety.

FIELD

The present invention relates to the field of communications, and in particular, to a method and a device for updating a port index, and a multi-device system.

BACKGROUND

A device ID (identifier) is used to identify a member device in a multi-device system. One typical multi-device system is a stacking system. Stacking refers to combining multiple switching devices supporting a stacking feature and having the same hardware structure together to logically form a switching device.

The stacking system, where each switching device is referred to as a member switching device, specifically includes one master switching device and one or more slave switching devices. The master switching device is responsible for assigning device IDs to all member switching devices including the master switching device itself. A configuration file containing the device IDs and all or partial port configuration data is stored in the master switching device. The master switching device manages the entire stacking system according to the configuration file.

FIG. 1 is a schematic diagram of device IDs and corresponding ports in a stacking system, where the stacking system includes nine devices, which respectively are device 1, device 2, . . . , and device 9. Each device has multiple ports and each port has a port number. FIG. 1 also shows a port 2 of the device 9. When configuration information of a port is configured or acquired, the device ID and specific port number are used as a port index.

When a new device is added to and an existing device is removed from the stacking system, the device IDs of member devices in the system are changed. In such cases, if the corresponding relationship between the port configuration data and device ID of the device stored in the configuration database in the master device is not updated in time, the port configuration data cannot be indexed according to the device ID. For example, if the device ID of a device is changed from 9 to 8, when searching for the port configuration data according to the port index generated by the device ID 8 and port 2, either no corresponding configuration is found (assume that no device is set with an device ID 8 before), or the configuration of the port 2 of the original device 8 is found which is not the configuration of the port 2 of the device itself.

In summary, when a device ID is changed, a port index formed by the device ID and a port number cannot be used to correctly acquire port configuration data.

SUMMARY

In order to solve the above problem, the present invention provide a method and a device for updating a port index in time, and a multi-device system.

In a first aspect, the present invention provides a method for updating a port index in a multi-device system, where the method includes: detecting whether a device ID of a device in a multi-device system is changed, where the detecting is performed by comparing device IDs of each device in the multi-device system before and after the detection; and for a device whose device ID is changed in the system, updating a port index of the device according to a device ID after the change, where the port index is used to acquire configuration data of the port.

In a second aspect, the present invention provides a device in a multi-device system, where the device includes a detecting module configured to detect whether a device ID of a device in a multi-device system is changed, where the detecting is performed by comparing device IDs of each device in the multi-device system before and after the detection; and a port index updating module configured to, for a device whose device ID is changed in the system, update a port index of the device according to a device ID after the change, where the port index is used to acquire configuration data of the port.

In a third aspect, the present invention provides a multi-device system, where the multi-device system includes multiple devices described in the second aspect.

The present invention achieves the effect of correctly finding port configuration data according to a port index formed by an updated device ID when the device ID is changed.

DETAILED DESCRIPTION OF THE EMBODIMENTS

Because a port index for indexing port configuration data is formed directly by a device ID and a port number, and the device ID may change dynamically, considering that a bridge MAC (media access control) address of the device does not change, in order to ensure that correct port configuration data may be directly or indirectly indexed according to the device ID, the following embodiments are provided.

Embodiment 1

Figure 1:
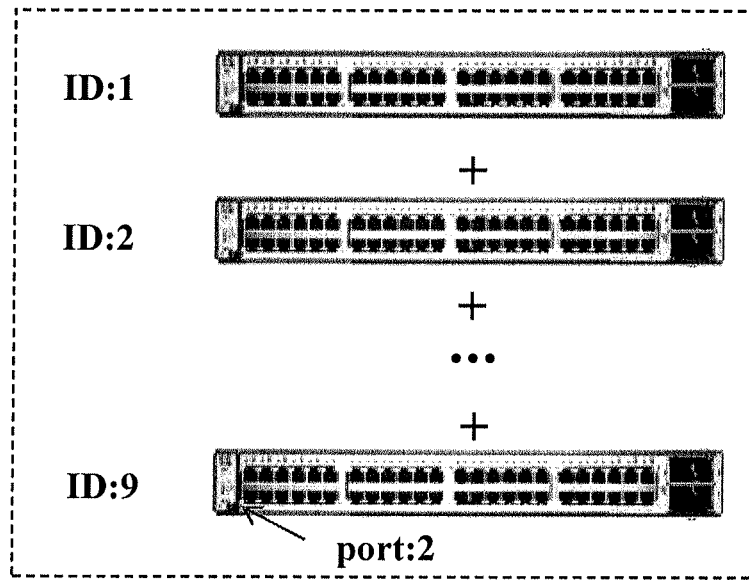
FIG. 1 is a schematic diagram of device IDs and corresponding ports in a stacking system.
Figure 2:
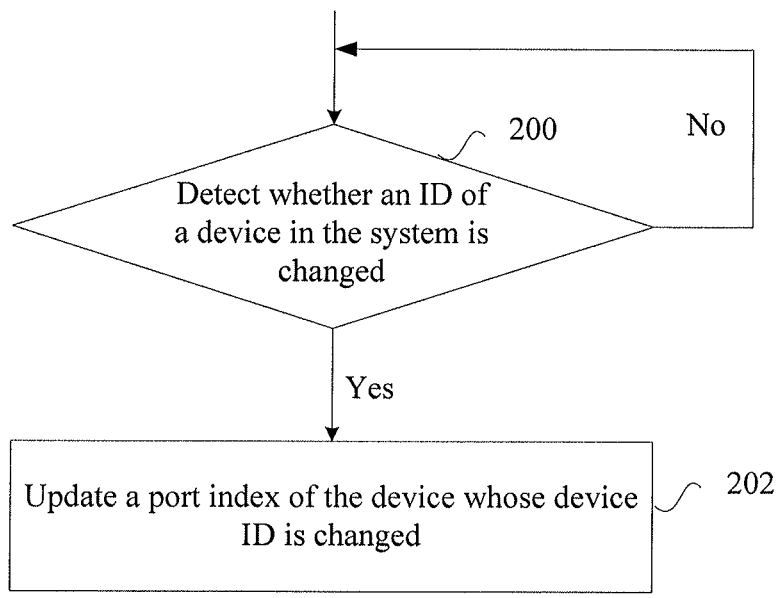
FIG. 2 is a flowchart of a method for updating a port index in a multi-device system according to Embodiment 1 of the present invention.

FIG. 2 is a flowchart of a method for updating a port index in a multi-device system according to Embodiment 1 of the present invention. The multi-device system includes one master device and one or more slave devices. As shown in FIG. 2, in step 200, the master device detects whether a device ID of a device in the system is changed; if yes, step 202 is triggered to update a port index of the device whose device ID is changed; and if not, the process returns to step 200.

In step 200, the detecting, by the master device, whether a device ID of a device in the system is changed, refers to detecting, by the master device, whether a device ID of a device among all devices in the multi-device system, including the master device, is changed. In addition, the master device, when detecting whether a device ID of a device in the multi-device system is changed, may actively perform detection periodically, or actively perform detection non-periodically. The detecting is performed by comparing device IDs of each device in the multi-device system before and after the detection. The means for determining whether a device ID of a device is changed is to compare whether values of the device IDs of the device in the multi-device system before and after the detection are the same. In an example, the detecting, by the master device, that a device ID of a device in the system is changed, may be performed by actively reporting, by the device whose device ID is changed, device ID changing-related information thereof.

The master device, when detecting that a device ID of a device in the system is changed, will modify the device ID in the port index in the configuration file. The configuration file is stored in the master device or stored in a configuration database connected to the master device, which is not limited herein. The port index is formed by a device ID and a port number.

In the above step 202, the updating a port index of the device whose device ID is changed specifically is: for the device whose device ID is changed in the system, updating the port index of the device whose device ID is changed according to a device ID after the change, where the port index is used to acquire configuration data of the port.

In an example, the port index includes a device ID and a port number. In such cases, the updating the port index of the device whose device ID is changed specifically includes: updating the device ID in the port index corresponding to the device before the device ID of the device is updated into the device ID after the change.

In order to acquire the configuration data of the port according to the port index, the method further includes establishing a corresponding relationship between the port index and the port configuration data. The corresponding relationship is stored in the master device or stored in a configuration database connected to the master device, which is not limited herein.

In another example, the port index includes a first index and a second index, where the first index includes a device ID and a corresponding bridge MAC address, and the second index includes the bridge MAC address and a port number. The first index including the device ID and the corresponding bridge MAC address actually implies that there is a corresponding relationship between the device ID and the corresponding bridge MAC address. In such cases, the updating the port index of the device whose device ID is changed specifically includes: updating the device ID in the first index of the port index corresponding to the device before the device ID of the device is updated into the device ID after the change.

In order to acquire the configuration data of the port according to the port index, the method further includes: establishing a corresponding relationship between the second index and the configuration data of the port. The corresponding relationship is stored in the master device or stored in a configuration database connected to the master device, which is not limited herein.

Figure 3A:
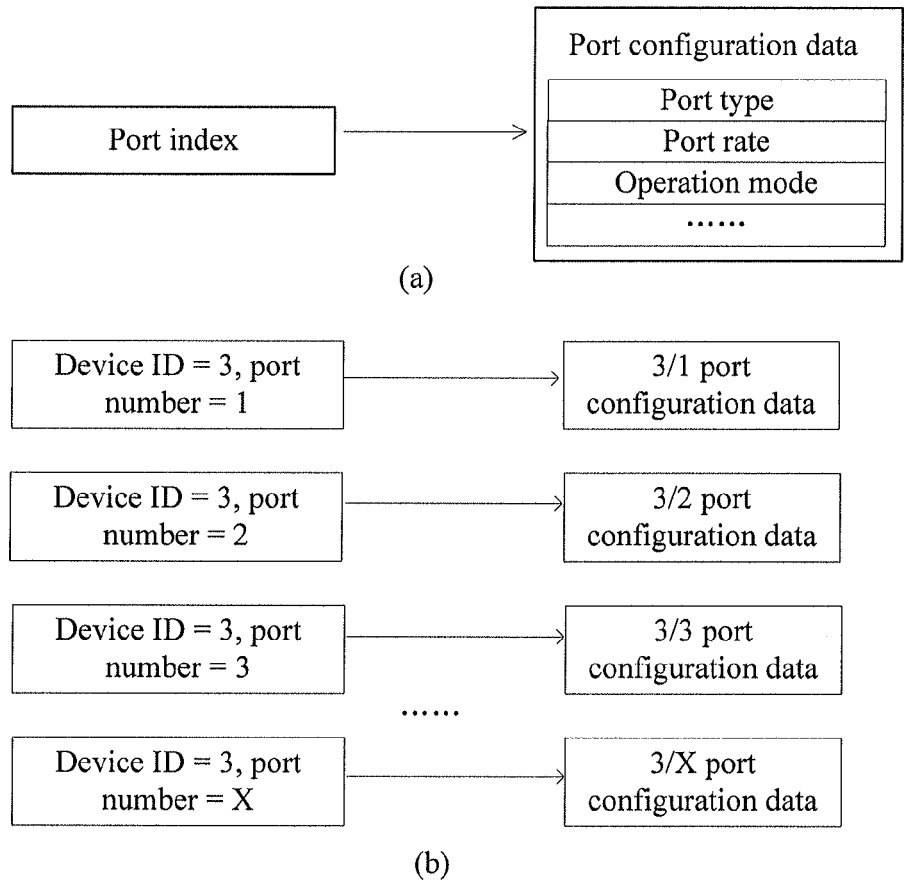
FIG. 3A is a schematic diagram of a corresponding relationship between a port index and port configuration data according to Embodiment 1 of the present invention.

FIG. 3A is a schematic diagram of a corresponding relationship between a port index and port configuration data. The port index includes a device ID and a port number. The corresponding relationship between the port index and the port configuration data is stored in a configuration file. The configuration file is stored in the master device or stored in a configuration database connected to the master device, which is not limited herein. As shown in FIG. 3A, a port index in (a) is formed by combining a device ID of a device where the port is located and a port number of the port. The port index is used to index port configuration data of a specific port, where the port configuration data includes a port type, a port rate, an operation mode of the port, and other configuration data of the port. The port type may be a GE gigabyte Ethernet interface, a trunk port, and the like. The operation mode may be duplex, simplex, and the like. The combination mode of the port index may be (device ID, port number), or (port number, device ID), or a combination in other modes, which is not limited herein. In (b), the port index is specifically exemplified, where the device ID=3, the device 3 includes X ports, and a different port number is assigned to every port, such as 1, 2, 3, . . . , X. For example, when device ID=3 and port number=1 are used as a port index, port configuration data of the port 3/1 may be indexed, where port 3/1 means the port 1 on the device 3.

In FIG. 3A, the port index directly uses the device ID, and according to the corresponding relationship between the port index and the port configuration data, a direct binding between the device ID and the port configuration data is kept. Because a bridge MAC address of a device remains unchanged, and the bridge MAC addresses of different devices are different, that is, there is a one-to-one corresponding relationship between the bridge MAC address and the device, a new port index is designed which includes a first index and a second index. The first index is formed by a device ID and a bridge MAC address; and the second index is formed by the bridge MAC address and a port number.

Figure 3B:
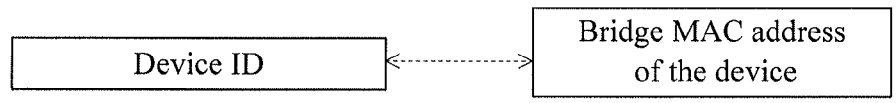
FIG. 3B is a schematic diagram of another corresponding relationship between a port index and port configuration data according to Embodiment 1 of the present invention.
Figure 3B:
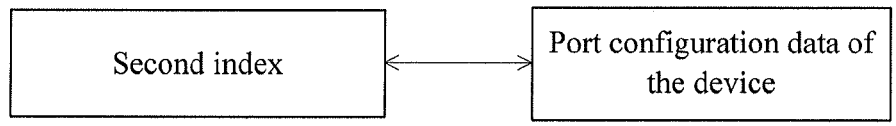

FIG. 3B is a schematic diagram of a corresponding relationship between a port index including the first index and the second index and the port configuration data. In FIG. 3B, the first index is formed by a device ID and a corresponding bridge MAC address, which actually implies that there is a corresponding relationship between the device ID and the corresponding bridge MAC address, thereby reflecting the corresponding relationship between the device ID and the bridge MAC address of the device. When the device ID is known, the bridge MAC address of the device may be found according to the first index. After the bridge MAC address is obtained, the second index may be formed by using the bridge MAC address and the specific port number, and then specific port configuration data may be found according to the established corresponding relationship between the second index and the port configuration data.

In FIG. 3B, the corresponding relationship between the device ID and the bridge MAC address is indicated by using a dashed line because the device ID may change dynamically. As for the function of the bridge MAC address, it is emphasized that the device may be found by using the bridge MAC address of the device; while in order to find configuration data of a specific port on the device according to the bridge MAC address, a specific port number needs to be used on the basis of the bridge MAC address; and according to the corresponding relationship shown in FIG. 3B between the combination of the bridge MAC address and the port number, namely, the second index, and the port configuration data, the corresponding port configuration data may be indexed. As for the example of the corresponding relationship between the second index and the port configuration data, reference may be made to the example of the corresponding relationship between the port index and the port configuration data shown in FIG. 3A, where only the device ID is replaced with the bridge MAC address for understanding, which will not be described repeatedly herein.

In addition, as for the port index including a two-stage index of a first index and a second index, it is obvious that the corresponding relationship between the second index formed by the bridge MAC address as well as the port number and the port configuration data does not vary as the device ID varies, which is a benefit of using the two-stage index, thereby enhancing the stability of the corresponding relationship related to the port configuration data.

In Embodiment 1 of the present invention, when a device ID of a device is changed, the device ID in a port index is updated, thereby avoiding the cases of failing to find corresponding port configuration data according to the port index because the device ID is dynamically switched.

In Embodiment 1 of the present invention, preferably, the device is a switching device, and the multi-device system is a stacking system.

Embodiment 2

Figure 4A:
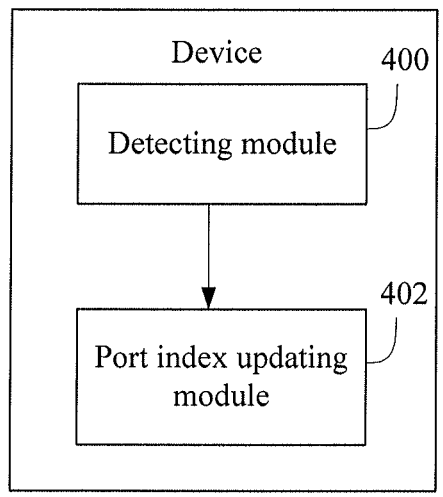
FIG. 4A is a schematic structural diagram of a device according to Embodiment 2 of the present invention.

FIG. 4A is a schematic diagram of a device according to Embodiment 2 of the present invention. The device is configured to implement the method shown in FIG. 2. Multiple devices may form a multi-device system. As shown in FIG. 4A, the device includes a detecting module 400 and a port index updating module 402. The detecting module 400 is configured to detect whether a device ID of a device is changed in a multi-device system, where the detecting is performed by comparing device IDs of each device in the multi-device system before and after the detection. The port index updating module 402 is configured to, for a device whose device ID is changed in the system, update a port index of the device according to a device ID after the change, where the port index is used to acquire configuration data of the port.

The detecting module 400, when detecting that a device ID of a device in the system is changed, instructs the port index updating module 402 to update the port index of the device whose device ID is changed. The configuration file is stored in the master device or stored in a configuration database connected to the master device, which is not limited herein.

It should be noted that, that the detecting module 400 is configured to detect whether a device ID of a device in the system is changed refers to detecting whether a device ID of a device among all devices including the master device in the system is changed. In addition, the detecting module 400, when detecting whether a device ID of a device is changed, may actively perform detection periodically, or actively perform detection non-periodically. The detecting is performed by comparing device IDs of each device in the multi-device system before and after the detection. It should be noted that, the detecting, by the detecting module 400, that a device ID of a device is changed in the system, may be performed by actively reporting, by the device whose device ID is changed, device ID changing-related information thereof.

Figure 4B:
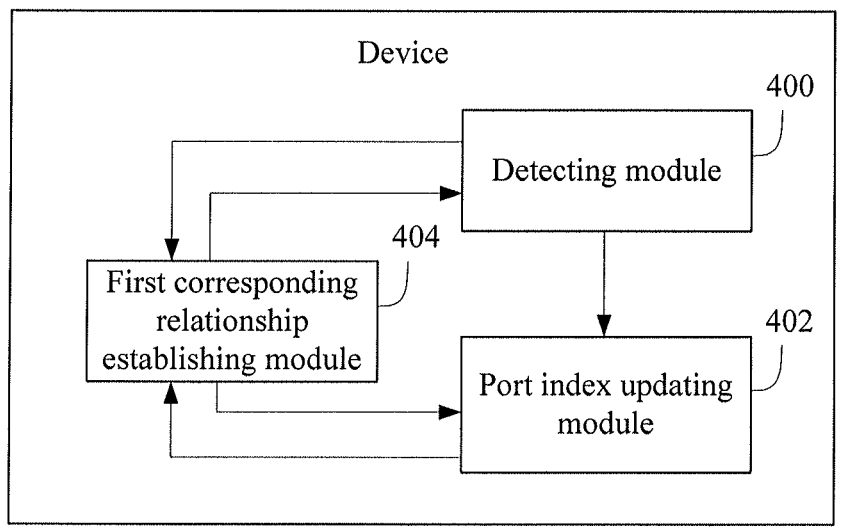
FIG. 4B is another schematic structural diagram of a device according to Embodiment 2 of the present invention.

In an example, the port index is formed by a device ID and a port number. In such cases, the updating, by the port index updating module 402, the port index of the device whose device ID is changed, specifically includes: updating, by the port index updating module 402, the device ID in the port index corresponding to the device before the device ID of the device is updated into the device ID after the change. In order to acquire the configuration data of the port according to the port index, the device further includes a first corresponding relationship establishing module 404, configured to establish a corresponding relationship between the port index and the configuration data of the port. In such cases, the schematic diagram of the device is shown in FIG. 4B. The corresponding relationship is stored in the master device or stored in a configuration database connected to the master device, which is not limited herein.

Figure 4C:
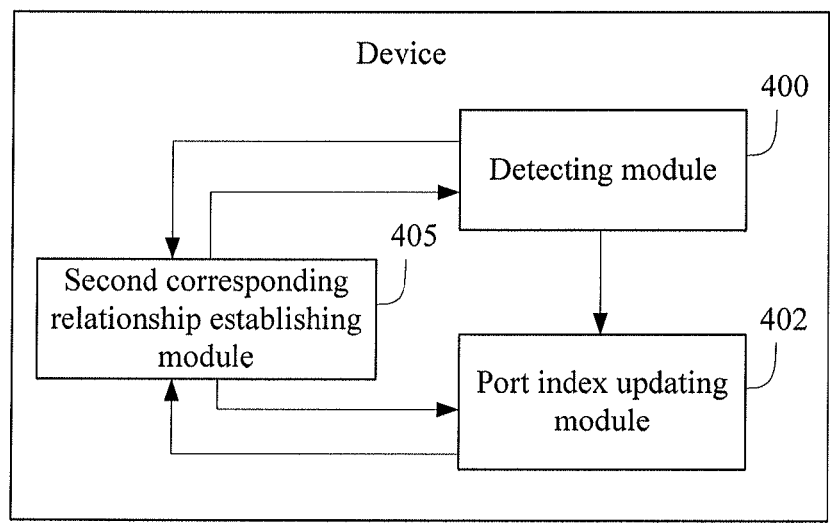
FIG. 4C is another schematic structural diagram of a device according to Embodiment 2 of the present invention.

In another example, the port index includes a first index and a second index, where the first index includes a device ID and a corresponding bridge MAC address, and the second index includes the bridge MAC address and a port number. In such cases, the updating, by the port index updating module 402, the port index of the device whose device ID is changed, specifically includes updating, by the port index updating module 402, the device ID in the first index of the port index corresponding to the device before the device ID of the device is updated into the device ID after the change. In order to acquire the configuration data of the port according to the port index, the device further includes a second corresponding relationship establishing module 405, configured to establish a corresponding relationship between the second index and the port configuration data. In such cases, the schematic diagram of the device is shown in FIG. 4C. The corresponding relationship is stored in the master device or stored in a configuration database connected to the master device, which is not limited herein.

In Embodiment 2 of the present invention, when a device ID of a device in a multi-device system is changed, the device ID in a port index is updated, thereby avoiding the cases of failing to find correct port configuration data according to the port index because the device ID is changed.

In Embodiment 2 of the present invention, the device may be a switching device.

Embodiment 3

Embodiment 3 of the present invention provides a multi-device system, where the multi-device system consists of multiple devices described in the Embodiment 2 of the present invention. When the device described in the Embodiment 2 of the present invention is a switching device, the multi-device system is a stacking system.

Based on the preceding embodiments, for a multi-device system, if a device ID is changed, in order to correctly index port configuration data, the device ID in the relevant port index must be updated, thereby updating the port index. For the multi-device system, an important reason why the device ID is changed is that a new device is added to and an existing device is removed from the multi-device system. In cases where a device is removed, it is unnecessary for the system to modify a device ID of any device, because the device IDs of all remaining devices are not changed, and no change occurs on either the corresponding relationship between the device ID and the bridge MAC address implied by the first index formed by the device ID and the bridge MAC address, or the corresponding relationship between second index formed by the bridge MAC address as well as the port number and the port configuration data. Therefore, for the remaining devices, the cases of failing to correctly indexing the port configuration data according to the device ID will not occur. Assuredly, in cases where a device is removed, the master device may also re-assign device IDs to all member devices, and the effect of the embodiments of the present invention may also be achieved according to the solutions of Embodiments 1 to 3, which is not described repeatedly herein. The following describes the solution of Embodiment 4 of the present invention by using an example where a new device is added to the multi-device system.

Embodiment 4

Figure 5:
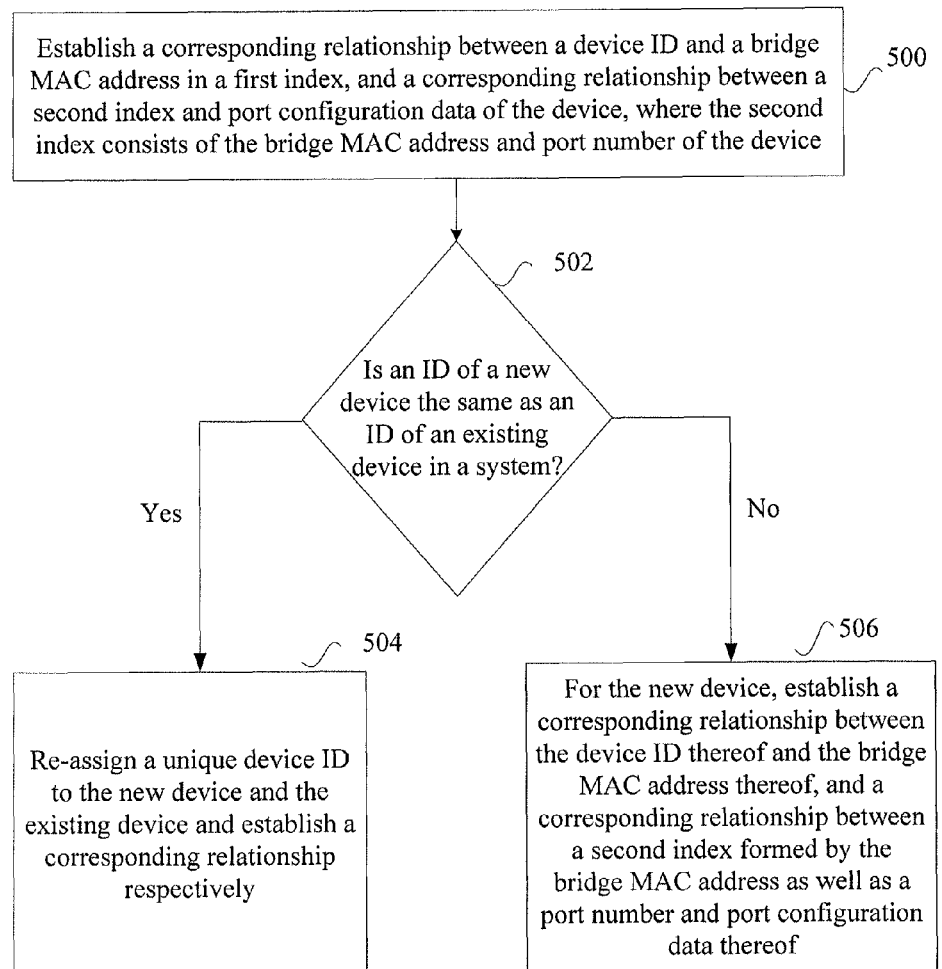
FIG. 5 is a flowchart of a method for updating a port index caused by re-assigning device IDs according to Embodiment 4 of the present invention.

FIG. 5 is a flowchart of another method for updating a port index in a multi-device system according to Embodiment 4 of the present invention. As shown in FIG. 5, in step 500, a corresponding relationship between a device ID and a bridge MAC address in a first index and a corresponding relationship between a second index and port configuration data of the device are established, where the first index is formed by the device ID and the bridge MAC address, and the second index is formed by the bridge MAC address and a port number.

When a multi-device system is formed, a master device assigns different device IDs to all member devices including the master device; for every device, establishes a corresponding relationship between the device ID and bridge MAC address thereof; establishes a corresponding relationship between a second index formed by the bridge MAC address as well as a port number of the device and the port configuration data of the device; and stores the corresponding relationships into a configuration file.

The master device assigns different device IDs to all member devices including the master device itself according to specific rules. For example, the master device first collects bridge MAC addresses of all member devices including the master device itself, where the bridge MAC addresses of slave devices may be implemented by requesting the slave devices to report the same or by actively reporting the same by the slave devices. Then, the master device sorts all bridge MAC addresses according to the values, and directly uses ranking numbers as device IDs of corresponding devices. Certainly, other rules may also be used, for example, different device IDs are assigned according to operation durations of member devices or according to levels of priorities, which is not limited herein.

It should be noted that, the establishing the corresponding relationship between the device ID and the bridge MAC address in the first index, and the establishing the corresponding relationship between the second index and the port configuration data, may be performed in a random sequence.

Step 502. Determine whether a device ID of a new device to be added to the system is the same as a device ID of an existing device; if yes, step 504 is triggered; otherwise, step 506 is triggered.

Step 504. Re-assign a unique device ID to the new device or the existing device and establish a corresponding relationship. Specifically, the following two solutions are available:

(1) Re-assign a unique device ID to the new device; keep the original device ID of the existing device; and establish and store a corresponding relationship between a newly assigned device ID of the newly added device and the bridge MAC address thereof, and a corresponding relationship between a second index formed by the bridge MAC address as well as a port number and port configuration data thereof.

(2) Re-assign a unique device ID to the existing device; keep the original device ID of the new device; remove the corresponding relationship between the original device ID of the first device and the bridge MAC address of the existing device; establish a new corresponding relationship between the new device ID assigned to the existing device and the bridge MAC address of the existing device; and establish and store a corresponding relationship between the device ID of the newly added device and the bridge MAC address thereof, and a corresponding relationship between a second index formed by the bridge MAC address as well as a port number and port configuration data thereof.

It should be noted that in the above two solutions, it is assumed that except for the first device and the newly added device, the device IDs of the other devices are not re-assigned, that is, remain unchanged. For part or all of the devices whose device IDs are changed except for the existing device and the newly added device, the following operations need to be performed: removing the corresponding relationships between the original device IDs and bridge MAC addresses, and establishing new corresponding relationships between the new device IDs assigned thereto and the bridge MAC addresses. For the corresponding relationships between the second index formed by the bridge MAC addresses as well as port numbers thereof and the port configuration data thereof, no change is made because the corresponding relationship does not vary as the device IDs vary.

Step 506. For the new device, establish and store a corresponding relationship between the device ID thereof and the bridge MAC address thereof, and a corresponding relationship between a second index formed by the bridge MAC address as well as a port number and port configuration data thereof. The device ID may be the original device ID of the new device or the device ID re-assigned to the new device.

It should be noted that in the solution of step 506, it is assumed that the device IDs of all devices in the original multi-device system before the new device is added are remained. For part or all of the devices whose device IDs are changed except for the existing device because the new device is added, the following operations need to be performed: removing the corresponding relationships between the original device IDs and bridge MAC addresses, and establishing new corresponding relationships between the new device IDs assigned thereto and the bridge MAC addresses. For the corresponding relationships between the second index formed by the bridge MAC addresses as well as port numbers thereof and the port configuration data thereof, no change is made because the corresponding relationship does not vary as the device IDs vary.

Figure 6A:
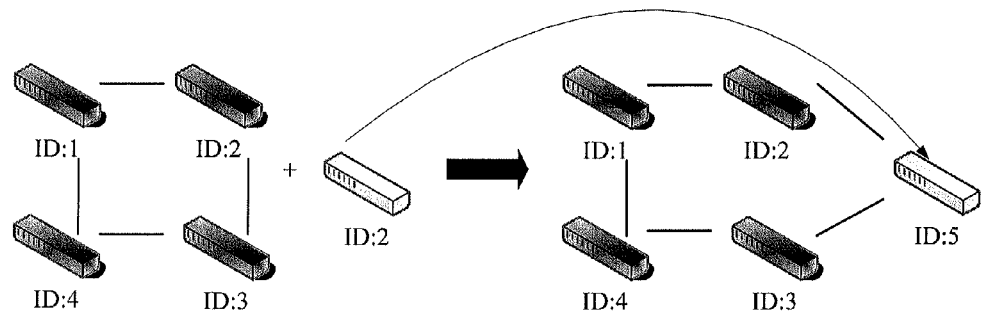
FIG. 6A and FIG. 6B are two schematic diagrams illustrating a change of device IDs in a stacking system before and after a new device is added according to Embodiment 4 of the present invention.
Figure 6B:
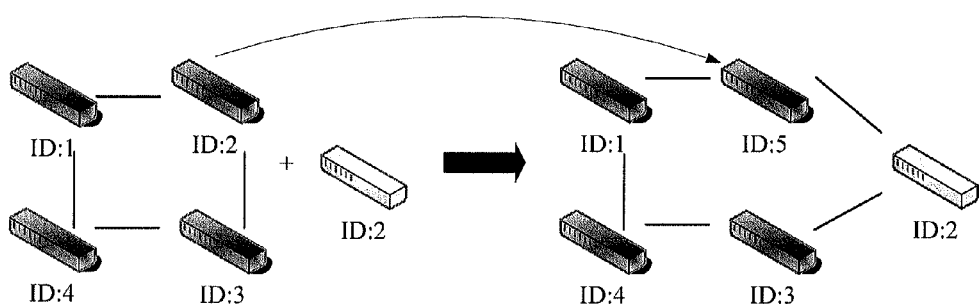

FIG. 6A and FIG. 6B are two schematic diagrams illustrating a change of device IDs in a stacking system before and after a new device is added according to Embodiment 4 of the present invention. As shown in FIG. 6A and FIG. 6B, before a new device 2 is added, a stacking system includes four member devices. After the system is powered on, one master device is selected from the four member devices of the stacking system according to specific rules, and the other member devices are slave devices. The master device is responsible of assigning and managing the device IDs of all member devices.

For the convenience of description, it is assumed that the device ID of the master device is 1, and the device IDs of the other three slave devices are respectively 2, 3, and 4. That is, the stacking system currently includes the master device 1, the slave device 2, the slave device 3, and the slave device 4.

When a new device 2 whose device ID is 2 is to be added to the stacking system, although the device ID of the new device is 2, which is the same as the device ID of the existing device 2 in the system, the bridge MAC addresses of them are different, the stacking system is still capable of differentiating them. Firstly, the master device 1 requires the new device 2 to report the bridge MAC address and corresponding port configuration data thereof, and then the following two operations are available:

(1) using 5 as the new device ID of the new device 2, and then storing a corresponding relationship between the device ID 5 of the newly added device and the bridge MAC address thereof and a corresponding relationship between a second index formed by the bridge MAC address as well as a port number and the port configuration data in a configuration file of the master device 1; and (2) using 5 as the new device ID of the existing device 2; removing the corresponding relationship between the device ID 2 of the existing device 2 and the bridge MAC address thereof from the configuration file of the master device 1; establishing and storing a corresponding relationship between the newly assigned device ID 5 and the bridge MAC address thereof; and for the newly added device 2, retaining the device ID 2, and establishing and storing a corresponding relationship between the device ID 2 thereof and the bridge MAC address thereof, and a corresponding relationship between the second index formed by the bridge MAC address thereof as well as the port number and port configuration data thereof.

In the above two operation solutions, it is assumed that the device IDs of the existing member device 1, device 3, and device 4 are not changed. If the device IDs of the existing member device 1, device 3, and device 4 are also changed, for the changed devices, the following operation needs to be performed: removing the corresponding relationship between the original device ID thereof and the bridge MAC address thereof, and establishing and storing a corresponding relationship between a newly assigned device ID and the bridge MAC address thereof. For the changed devices, no change is made to the corresponding relationships between the second indexes formed by the bridge MAC addresses and port numbers thereof and the port configuration data thereof, because the corresponding relationships do not vary as the device IDs vary.

Finally, it should be noted that, the device IDs in all embodiments of the present invention may be dynamically displayed in a display module of the device in real time. Specifically, the device ID may be acquired from a configuration database through a database subscription message by using a managing module of the devices, and the acquired device ID may be sent to the display module of the devices for displaying in real time, thereby helping a user to immediately and directly know the device IDs of the member devices. The display module is, preferably, an LED lamp, a liquid crystal display, or another display device, which is not limited herein. The device is, preferably, a switching device, and the multi-device system is, preferably, a stacking system.

In the embodiments provided in the present invention, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms. The units described as separate parts may or may not be physically separate, and parts displayed as units may or may not be physical units, may be located in one position, or may be distributed on multiple network units. A part or all of the units may be selected according to the actual needs to achieve the objectives of the solutions of the embodiments.

In addition, functional units and devices in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated units are implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, and the like) to perform all or a part of steps of the methods described in the embodiments of the present invention. The storage medium includes any medium that can store program code, such as a USB flash disk, a removable hard disk, a read-only memory (Read-Only Memory, ROM), a random access memory (Random Access Memory, RAM), a magnetic disk, or an optical disk.

The foregoing specific embodiments further describe the objectives, technical solutions, and benefits of the present invention in detail. It should be understood that the foregoing descriptions are merely specific embodiments of the present invention, but are not intended to limit the protection scope of the present invention. Any modification, equivalent replacement, or improvement made within the principle of the present invention shall fall within the protection scope of the present invention.

What is claimed is:

1. A method for updating a port index in a multi-device system, comprising:
    detecting, by a master device of the multi-device system, whether a device ID of a device is changed in the multi-device system, wherein the detecting is performed by comparing device IDs of each device in the multi-device system before and after the detection; and
    for a device whose device ID is changed in the system, updating, by the master device, a port index of the device according to a device ID after the change, wherein the port index is used to acquire configuration data of the port, wherein the port index comprises a first index and a second index, the first index comprises a device ID and a corresponding bridge MAC address, and the second index comprises the bridge MAC address and a port number.

2. The method according to claim 1, further comprising:
    establishing, by the master device, a corresponding relationship between the port index and the configuration data of the port.

3. The method according to claim 1, wherein the port index comprises a device ID and a port number; and
    the updating a port index of the device comprises:
    updating, by the master device, a device ID in the port index corresponding to the device before the device ID of the device is updated into the device ID after the change.

4. The method according to claim 1, further comprising:
    establishing, by the master device, a corresponding relationship between the second index and the configuration data of the port.

5. The method according to claim 1, wherein the updating a port index of the device comprises:

updating, by the master device, a device ID in the first index of the port index corresponding to the device before the device ID of the device is updated into the device ID after the change.

6. The method according to claim 1, wherein the master device is a switching device, and the multi-device system is a stacking system.

7. A master device in a multi-device system and implemented by computer hardware, comprising a processor and a memory configured to:
   detect whether a device ID of a device is changed in the multi-device system, wherein the detecting is performed by comparing device IDs of each device in the multi-device system before and after the detection; and
   for a device whose device ID is changed in the system, update a port index of the device according to a device ID after the change, wherein the port index is used to acquire configuration data of the port and wherein the port index comprises a first index and a second index, the first index comprises a device ID and a corresponding bridge MAC address, and the second index comprises the bridge MAC address and a port number.

8. The master device according to claim 7, wherein the processor is further configured to:
   establish a corresponding relationship between the port index and the port configuration data.

9. The master device according to claim 7, wherein the port index comprises a device ID and a port number; and
   when updating a port index of the device according to a device ID after the change, the processor is configured to:
   update a device ID in the port index corresponding to the device before the device ID of the device is updated into the device ID after the change.

10. The master device according to claim 7, wherein the processor is further configured to:
    establish a corresponding relationship between the second index and the configuration data of the port.

11. The master device according to claim 7, wherein when updating a port index of the device according to a device ID after the change, the processor is configured to:
    update a device ID in the first index of the port index corresponding to the device before the device ID of the device is updated into the device ID after the change.

12. The master device according to claim 7, wherein the master device is a switching device.

13. A multi-device system, wherein the multi-device system comprises a master device and at least one slave device, the master device is configured to:
    detect whether a device ID of a device is changed in the multi-device system, wherein the detecting is performed by comparing device IDs of each device in the multi-device system before and after the detection; and
    for a device whose device ID is changed in the system, update a port index of the device according to a device ID after the change, wherein the port index is used to acquire configuration data of the port and wherein the port index comprises a device ID and a port number, and that the master device update a port index of the device comprise: updating a device ID in the port index corresponding to the device before the device ID of the device is updated into the device ID after the change.

14. The system according to claim 13, wherein the master device is further configured to establish a corresponding relationship between the port index and the configuration data of the port.

15. The system according to claim 13, wherein the port index comprises a first index and a second index, the first index comprises a device ID and a corresponding bridge MAC address, and the second index comprises the bridge MAC address and a port number.

16. The system according to claim 15, wherein the master device is further configured to establish a corresponding relationship between the second index and the configuration data of the port.

17. The system according to claim 15, wherein that the master device update a port index of the device comprises:
    updating a device ID in the first index of the port index corresponding to the device before the device ID of the device is updated into the device ID after the change.

* * * * *